United States Patent Office 3,076,691
Patented Feb. 5, 1963

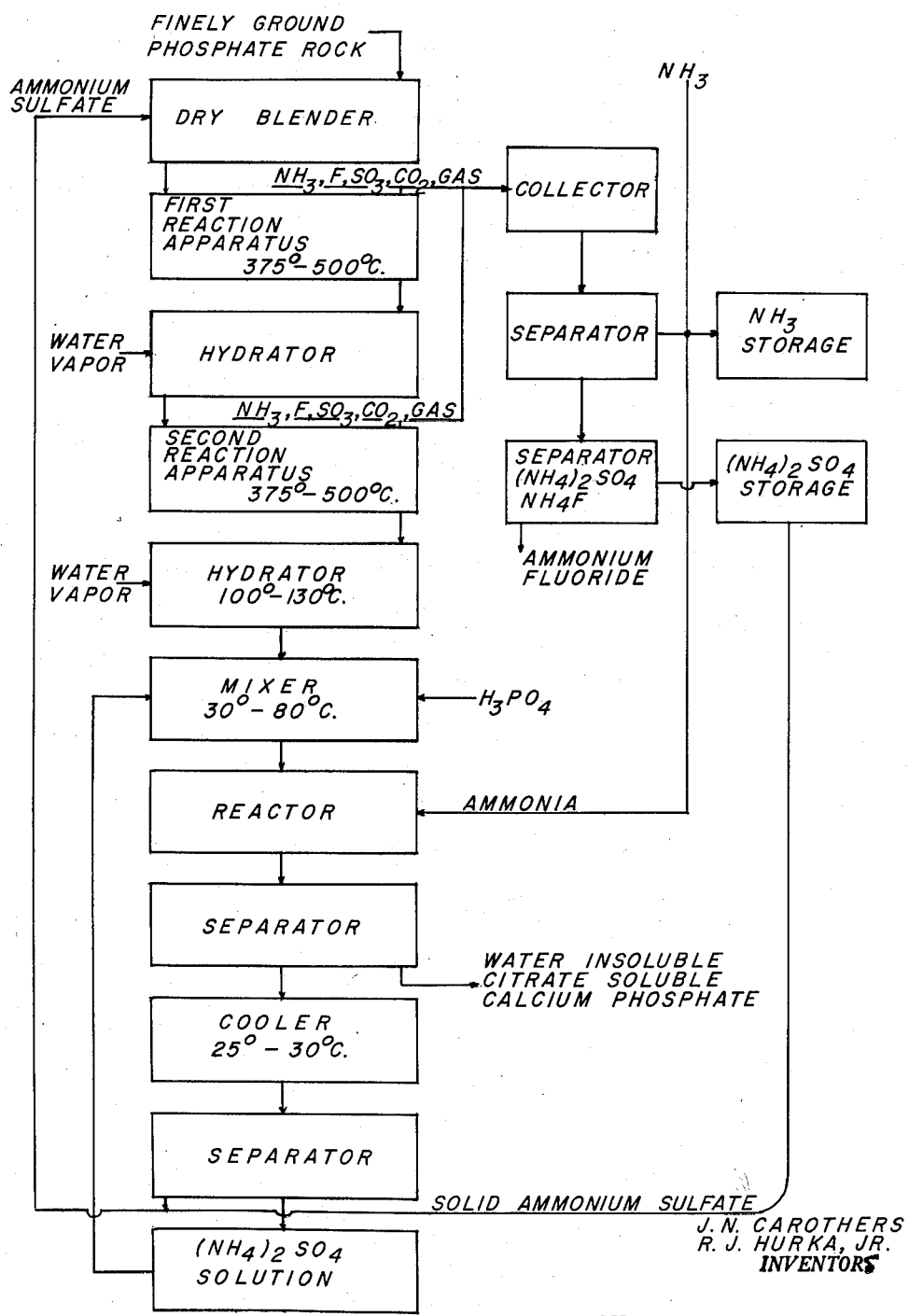

3,076,691
PROCESS OF TREATING PHOSPHATE ROCK
John N. Carothers and Rudolph J. Hurka, Jr., both of 1629 Lady Marion Lane NE., Atlanta 9, Ga.
Filed Jan. 23, 1961, Ser. No. 83,977
12 Claims. (Cl. 23—109)

This invention relates to a process for treating fluorine-containing phosphate rocking whereby to obtain low fluorine phosphatic materials and to recover fluorine compounds in usable form.

More particularly, our invention relates to a process of treating fluorine-containing phosphate rock which shall be simple and economical to carry out and by means of which phosphates shall be produced in which the weight ratio of phosphorus to fluorine is at least 100 to 1.

Still more specifically, our invention relates to a process for treating fluorine-containing phosphate rock in which the phosphate rock is caused to react with ammonium sulfate in such a way as to free the fluorine from the phosphate rock and produce water soluble phosphates and sulfates which latter may be assumed to be, in part, calcium sulfate, although, at present, we do not know the forms in which the sulfate, phosphate and calcium components are combined.

Among the objects of our invention are:

(1) The removal of fluorine from phosphate rock and its subsequent recovery in usable form.

(2) The conversion of the $P_2O_5$ content of the phosphate rock into intermediate forms from which useful compounds may be made.

(3) The recovery of the reagent used in treating the phosphate rock.

(4) The conversion of the $P_2O_5$ content of the phosphate rock into a water insoluble, but citrate soluble form, substantially free of fluorine.

(5) The production of citrate soluble phosphatic material from fluorine-containing phosphate rock, which shall contain substantially all of the calcium and phosphorus initially present in the phosphate rock.

Following is typical of the composition of phosphate rocks commercially used in the preparation of phosphates:

|   | Percent |
|---|---|
| Iron and aluminum oxides | 1½–3 |
| Calcium fluoride | 6–8 |
| Calcium carbonate | 4–8 |
| Tricalcium phosphate (BPL) | 68–78 |

It will be seen that the calcium present as $CaF_2$ and $CaCO_3$ is in excess of that in combination with the $P_2O_5$ in the phosphate rock. As will be shown hereinafter, we may utilize this excess calcium in producing calcium phosphates.

It has heretofore been proposed to produce fertilizer materials by heating phosphate rock with ammonium sulfate. For example, see the patent to Blumenberg, No. 1,251,742, and to Barnes, No. 2,750,270. So far as we are aware, however, no process has been disclosed for the production of phosphates by heating phosphate rock with ammonium sulfate in which the phosphorus to fluorine ratio in the product obtained is a minimum of 100/1, or for the production of phosphates which contain all of the calcium and phosphate initially present in the phosphate rock and from which substantially all of the sulfate used in processing has been recovered.

As is well known in the art to which our invention relates, water insoluble calcium phosphate, more basic than dicalcium phosphate, generally regarded as tricalcium phosphate, has heretofore usually been found to be citrate insoluble. By means of our present discovery we produce calcium phosphate more basic than dicalcium phosphate which is citrate soluble.

In accordance with our invention we heat a mixture of finely ground phosphate rock and ammonium sulfate at a temperature of from 375° C. to 500° C. to volatilize the fluorine present in the rock in the form of fluorine compounds. The citrate insoluble $P_2O_5$ in the material obtained by this heating, hereinafter referred to as the "intermediate product," will be less than 10% of the $P_2O_5$ contained in the rock before heating. The heated material is then hydrated, after which an ammonium sulfate solution is mixed with the hydrated material, followed by the addition of ammonia, either in the form of gas or aqua ammonia, whereupon the $P_2O_5$ is precipitated as a calcium phosphate substantially all of which is more basic than dicalcium phosphate, and ammonium sulfate is formed. The use of ammonium sulfate solution is mainly for the purpose of providing a medium for the formation and precipitation of citrate soluble, water insoluble calcium phosphate. The ammonium sulfate solution may conveniently be saturated at 30° C. and is used in an amount sufficient to produce a slurry. We may also add sufficient phosphoric acid to the intermediate product to react with the excess calcium present in the phosphate rock.

The ammonium sulfate is subsequently separated from the phosphate by suitable means and recovered. The gases which are evolved in the heating step are passed into a gas collector wherein the fluorine bearing compounds are collected and then separated. Some ammonium sulfate evolved in the heating step is collected and is separated from the fluorine compounds by well known methods. The fluorine may be converted into the desired compounds by known methods.

The intermediate product just described has the major portion of the fluorine content of the phosphate rock removed, and when hydrated and reacted with ammonia, as hereafter described, produces water insoluble, citrate soluble phosphates, low in fluorine, suitable as a fertilizer. Where further removal of fluorine is desired, the intermediate product, after hydration, is reheated, again hydrated, and then reacted with ammonia to produce a product from which substantially all of the fluorine is removed and a product suitable as an animal feed supplement, as well as a fertilizer, is produced.

One of the important features of this process is the completeness and rapidity with which the fluorine may be removed from the phosphate rock when the rock is heated with ammonium sulfate in accordance with our procedure. From the defluorinated product substantially all of the sulfate initially employed is recovered in the form of ammonium sulfate, and a calcium phosphate material substantially free of fluorine and containing material more basic than dicalcium phosphate is finally obtained.

Our improved process will now be described more in detail having reference to the accompanying drawing showing a flow sheet of the process. Throughout this specification wherever the term "parts" is used, parts by weight are intended. "Finely ground" refers to material having a particle size no larger than 200 mesh, and preferably no larger than 40 to 20 microns. "Reacting materials" refers to the mixture of phosphate rock and ammonium sulfate.

Finely ground phosphate rock and ammonium sulfate in the proportions of 1.2 to 1.4 parts ammonium sulfate to one part phosphate rock are thoroughly mixed in any suitable dry blender which will give uniform particle distribution. We have found that where the mixture is tumbled for a few minutes and then suspended in a turbulent air stream and collected, a satisfactory particle distribution may be obtained. We have found that the reaction proceeds quicker and more smoothly where there is intimate contact between individual particles of phosphate rock and ammonium sulfate.

The mixture just described is fed into a first reaction apparatus in a confined path maintained at a temperature within the range of from 375° to 500° C., preferably between 400° and 430° C. The reaction apparatus should include means to move the reacting materials through said confined path from the feed to the discharge end, preferably in a thin stream. It should also include means to provide a slow flow of air to remove evolved gases. The air and evolved gases are removed at a point between the feed and discharge ends of the apparatus, preferably at a point nearer the discharge end, as indicated in the drawing. We have found that the fluorine is removed more satisfactorily when the reacting materials are maintained in a thin layer than where a thicker layer is being heated. Satisfactory fluorine removal is obtained where the reacting materials are in the reacting apparatus from one half to three minutes.

The substances present in the gases evolved from the first reaction apparatus are principally ammonia, water, carbon dioxide, compounds containing sulfur, and compounds containing fluorine. The gases are conducted to a collector of any suitable design and may subsequently be separated by known methods to obtain ammonia, ammonium sulfate, and ammonium fluoride. The ammonia and ammonium sulfate may be re-used in the process as hereinafter described.

The intermediate product discharged from the first reaction apparatus is small in size, pulverulent, contains no dense particles or lumps, and is hygroscopic. The material is fed into a hydrator, as indicated, where it is exposed to a moist atmosphere for a period of from one to three hours where it takes up water up to 4% to 20% of its weight.

Following hydration the intermediate product is preferably allowed to stand for a period of time which need not exceed 24 hours, and is then fed into a second reaction apparatus where it is reheated. The second reaction apparatus may, in all respects, be similar to the first, and the reheating step is carried out similarly to that in the first reaction apparatus. The intermediate product is heated to a temperature of from 375° to 500° C., the gases are removed at an intermediate point in the apparatus and are conducted to the collector along with those from the first reaction apparatus.

The reheated intermediate product is in the form of powdery, dry, free flowing, small particles in which the ratio of phosphorus to fluorine is at least 100 to 1. This product is then fed into a hydrator where it is subjected to an atmosphere of steam at a temperature of from 100° C. to 130° C. for a period of from one to four hours.

We have found that both of the hydration steps are very important in that they render the materials highly reactive in preparation for succeeding steps in our process. We have further found that they are highly important in preparing the materials for removing substantially all of the fluorine from the phosphate rock, as successive heating of the reacting materials, without intervening hydration, fails to reduce the fluorine content to the required lower limit.

The hydrated material is then placed in a mixer where it is suspended in a solution of ammonium sulfate. At this point we may also add sufficient phosphoric acid to combine with the calcium present which is in excess of that combined with the $P_2O_5$ in the rock. By doing this we may utilize all of the calcium in the rock to form water insoluble, citrate soluble phosphates and eliminate substantially all sulfate from the final product.

The mixture of hydrated, defluorinated material and ammonium sulfate is placed in a reactor where ammonia, either in a gaseous or aqueous form is added in an amount sufficient to react with all the acidic hydrogen present and to convert the sulfate compounds present to ammonium sulfate and the calcium compounds present to calcium phosphate. The reaction is carried out at a temperature below 80° C., preferably at a temperature between 30° C. and 60° C.

Since the calcium phosphate is a solid and the ammonium sulfate is in solution, they may be separated by any well known means, such as by filtering or centrifuging. The solid calcium phosphate is washed with water to remove ammonium sulfate solution and is dried. It is then ready for final disposition. It will be found that the fluorine content of this material has been reduced to where the phosphorus to fluorine ratio is at a minimum of 100 to 1, and that the product contains substantially all of the phosphate and calcium which was initially present in the phosphate rock. It is water insoluble and citrate soluble and may be used either as a fertilizer or as an animal feed supplement. The fluorine compounds collected from the evolved gases are readily convertible to a marketable product and the ammonia and ammonium sulfate recovered are reused as indicated on the flow sheet, with a subsequent batch of reacting materials.

Thus there are no waste materials in our process and the only fresh material required with each succeeding batch is the ammonia necessary to react with the evolved fluorine and form ammonium fluoride.

Instead of treating the intermediate material as hereinbefore described, we may expose it to water vapor at a temperature of 100° C. to 130° C. for a period of from one to three hours which renders the hydrated material highly reactive. The material so hydrated is reacted with ammonia in the manner above described to produce water insoluble, citrate soluble, calcium phosphate, more basic than dicalcium phosphate and ammonium sulfate. This product may be used as a fertilizer with high ammonia content. For economic reasons we prefer to separate the ammonium sulfate from the calcium phosphate for reuse in the process. This leaves water insoluble, citrate soluble calcium phosphate suitable as a phosphatic fertilizer.

We have also carried out our process by heating the reacting materials in a stationary mass, as well as while in motion. As might be expected, the heating in a stationary mass took longer because of the time needed for the heat to penetrate the mass. In both heating procedures, satisfactory fluorine removal was obtained.

While we have described what now appears to be the best manner of carrying out our improved process, there are obvious modifications which may suggest themselves to those skilled in the art. For example, the reacting materials might be heated, hydrated, and reheated two or more times. The ammonium sulfate, instead of being added all at the beginning with the phosphate rock, might be added, a part prior to the first heating, and more at a reheating of the reacting materials. Aqua ammonia may be added to the hydrated intermediate product alone and then the mix may be slurried with water to recover ammonium sulfate; the hydrated intermediate product may be added to a solution of ammonium sulfate containing the ammonia; or a slurry of the hydrated intermediate product may be added simultaneously with the ammonia to a solution of ammonium sulfate. The requirement is that the hydrated intermediate product be brought into a solution with ammonia which will produce ammonium sulfate and calcium phosphate.

Other various changes and modifications will suggest themselves to those skilled in the art, without departing from the scope of our invention, and it is to be understood, therefore, that only such limitations shall be placed thereupon as are specifically set forth in the appended claims.

What we claim is:

1. The process of producing water insoluble, citrate soluble calcium phosphate which comprises heating a mixture of finely divided phosphate rock and ammonium sulfate to a temperature of 375° C. to 500° C., hydrating the resulting product by exposing it to a moist atmosphere, reacting said hydrated product with ammonia to produce calcium phosphate and ammonium sulfate, and separating the ammonium sulfate from the calcium phosphate.

2. The process of producing water insoluble, citrate soluble calcium phosphate which comprises heating a mixture of finely divided phosphate rock and ammonium sulfate to a temperature of 375° to 500° C. to form an intermediate product, hydrating the intermediate product by exposing it to a moist atmosphere, reacting the hydrated intermediate product with ammonia while maintaining the temperature below 80° C. to produce calcium phosphate and ammonium sulfate, and separating the ammonium sulfate from the calcium phosphate.

3. The process of treating phosphate rock which comprises heating to a temperature of 375° to 500° C. a blended mixture of finely ground phosphate rock and ammonium sulfate in the proportions of 1.2 to 1.4 parts ammonium sulfate to one part of phosphate rock to form an intermediate product, hydrating the intermediate product by exposing it to a moist atmosphere, adding an ammonium sulfate solution to the intermediate hydrated product, reacting the intermediate hydrated product with ammonia while maintaining the temperature below 80° C. in an amount sufficient to convert the sulfates in the materials to ammonium sulfate and to precipitate the $P_2O_5$ as calcium phosphate, and separating the ammonium sulfate from the mixture.

4. The process of treating phosphate rock which comprises heating to a temperature of from 375° to 500° C. a blended mixture of finely ground phosphate rock and ammonium sulfate in the proportions of 1.2 to 1.4 parts ammonium sulfate to one part of phosphate rock to form an intermediate product, exposing the intermediate product to a moist atmosphere to hydrate it, reheating the hydrated intermediate product thus obtained to a temperature of from 375° to 500° C., hydrating the reheated intermediate product at a temperature of 100° C. to 130° C., suspending the reheated hydrated intermediate product in a solution of ammonium sulfate, reacting the reheated hydrated intermediate product with ammonia while maintaining the temperature below 80° C. in an amount sufficient to react with all the acidic hydrogen present and to convert the sulfates in the mixture to ammonium sulfate and to precipitate the $P_2O_5$ as calcium phosphate, and separating the ammonium sulfate from the mixture.

5. The process of treating phosphate rock which comprises heating to a temperature of 375° to 500° C. a blended mixture of finely ground phosphate rock and ammonium sulfate in the proportions of from 1.2 to 1.4 parts ammonium sulfate to one part of phosphate rock to form an intermediate product, moving said mixture in a confined path while heating it, removing evolved gases from said path at a point intermediate its ends, hydrating the intermediate product by exposing it to a moist atmosphere until it takes up from 4% to 7% of its weight in moisture, reheating the hydrated intermediate product to a temperature of from 375° to 500° C., hydrating the reheated intermediate product, suspending the reheated intermediate product in an ammonium sulfate solution, adding ammonia to said suspension in an amount sufficient to react with all of the acidic hydrogen present and to convert the sulfate compounds therein to ammonium sulfate and to precipitate the $P_2O_5$ therein to calcium phosphate while maintaining the temperature below 80° C., and separating the ammonium sulfate from the calcium phosphate.

6. The process defined in claim 5 in which phosphoric acid is added to the suspension in an amount sufficient to react with substantially all the calcium in said suspension in excess of that in combination with the $P_2O_5$ in the phosphate rock and form calcium phosphate.

7. The process defined in claim 5 in which the intermediate product is reheated while being moved in a confined path and the gases evolved during said heating are removed a point intermediate the ends of said path.

8. The process defined in claim 5 in which the reheated intermediate product is hydrated by exposure to an atmosphere of steam at a temperature of 100° C. to 130° C.

9. The process defined in claim 5 in which the phosphate rock is ground to a fineness of 40 to 20 microns and is blended with the ammonium sulfate by suspending the mixture in a turbulent air stream to provide intimate contact between individual particles of the mixture.

10. The process of treating phosphate rock which comprises heating to a temperature of 375° C. to 500° C. a blended mixture of finely ground phosphate rock and ammonium sulfate in the proportions of from 1.2 to 1.4 parts ammonium sulfate to one part phosphate rock to form an intermediate product, moving said mixture in a confined path while heating it, removing evolved gases from said path at a point intermediate its ends, hydrating the intermediate product by exposing it to a moist atmosphere until it takes up from 4% to 7% of its weight in moisture, reheating the hydrated intermediate product to a temperature of from 375° C. to 500° C., hydrating the reheated intermediate product, suspending the reheated intermediate product in an ammonium sulfate solution, adding the suspension to another ammonium sulfate solution containing ammonia in an amount sufficient to react with all of the acidic hydrogen present and convert the sulfate compounds therein to ammonium sulfate and to precipitate the $P_2O_5$ therein to calcium phosphate while maintaining the temperature below 80° C., and separating the ammonium sulfate from the calcium phosphate.

11. The process of treating phosphate rock which comprises heating to a temperature of from 375° C. to 500° C. a mixture of finely divided ammonium sulfate and phosphate rock in the proportions of 1.2 to 1.4 parts ammonium sulfate to one part phosphate rock, hydrating the product thus obtained by exposure to water vapor for a period of from one to four hours, and reacting the product thus obtained with ammonia at a temperature of from 30° C. to 80° C. to produce calcium phosphate and ammonium sulfate.

12. The process of treating phosphate rock which comprises heating to a temperature of from 375° C. to 500° C. a mixture of finely divided ammonium sulfate and phosphate rock in the proportions of 1.2 parts to 1.4 parts ammonium sulfate to one part phosphate rock, hydrating the product thus heated by exposure to water vapor at a temperature of from 100° C. to 130° C. until the product takes up from 4 to 20 percent of its weight in water, and reacting the hydrated product with ammonia at a temperature of from 30° C. to 80° C. in an amount sufficient to react with all the acidic hydrogen present in the product.

References Cited in the file of this patent
UNITED STATES PATENTS

| | | |
|---|---|---|
| 1,261,116 | Gardener | Apr. 2, 1918 |
| 1,869,879 | Balz et al. | Aug. 2, 1932 |
| 2,038,788 | Harvey et al. | Apr. 28, 1936 |
| 2,750,270 | Barnes | June 12, 1956 |